United States Patent [19]

Crapiz

[11] Patent Number: 5,032,201
[45] Date of Patent: Jul. 16, 1991

[54] METHOD FOR THE PRODUCTION OF A COMBUSTION CHAMBER FOR SOLID PROPELLANT ROCKET MOTOR

[75] Inventor: Dino Crapiz, Le Haillan, France

[73] Assignee: Societe Anonyme: Societe Europeenne de Propulsion, Suresnes, France

[21] Appl. No.: 346,352

[22] Filed: Apr. 28, 1989

Related U.S. Application Data

[63] Continuation of Ser. No. 115,753, Nov. 2, 1987, abandoned.

[30] Foreign Application Priority Data

Nov. 5, 1986 [FR] France .................. 86 15426

[51] Int. Cl.⁵ .................. F02K 9/02; B32B 31/00
[52] U.S. Cl. .................. 156/172; 60/253; 60/255; 102/289; 102/287
[58] Field of Search .................. 60/253, 255; 156/171–173, 175, 190–192, 195, 187–188; 102/285, 287, 289–291

[56] References Cited

U.S. PATENT DOCUMENTS

| | | | |
|---|---|---|---|
| 2,995,011 | 8/1961 | Kimmel | 102/285 X |
| 3,188,802 | 6/1965 | Davies | 102/290 X |
| 3,224,317 | 12/1965 | Gould | 60/255 X |
| 3,426,528 | 2/1969 | Mangum | 60/255 X |
| 3,952,506 | 4/1976 | McBeth | 60/255 |
| 4,118,928 | 10/1978 | Lyles | 60/255 |

FOREIGN PATENT DOCUMENTS

| | | |
|---|---|---|
| 22661 | 6/1883 | Fed. Rep. of Germany . |
| 921153 | 4/1947 | France . |
| 1356673 | 2/1964 | France . |
| 1386856 | 3/1964 | France . |
| 2123036 | 11/1969 | France . |
| 2363709 | 9/1977 | France . |
| 2552494 | 9/1983 | France . |
| 2593238 | 7/1987 | France . |

*Primary Examiner*—David A. Simmons
*Attorney, Agent, or Firm*—Weingarten, Schurgin, Gagnebin & Hayes

[57] ABSTRACT

Sectors of tubes are adhesively fixed around a prefabricated propellant, the sectors being juxtaposed edge to edge to constitute a cylindrical tube, and a winding is formed around the tube at least in circumferential direction. The front and rear walls which are equipped with a seating and a tuyere, can be joined to the tubular structure formed by the tube sectors, by adhesive means on the inside of that structure, or as a variant, by means of a helical winding formed simultaneously on the wall and on the tubular structure.

5 Claims, 2 Drawing Sheets

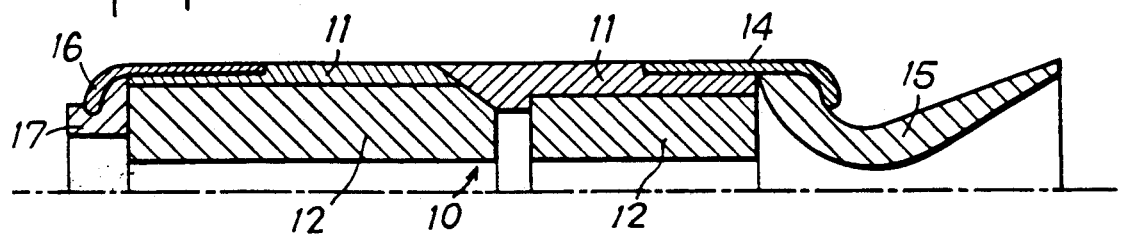
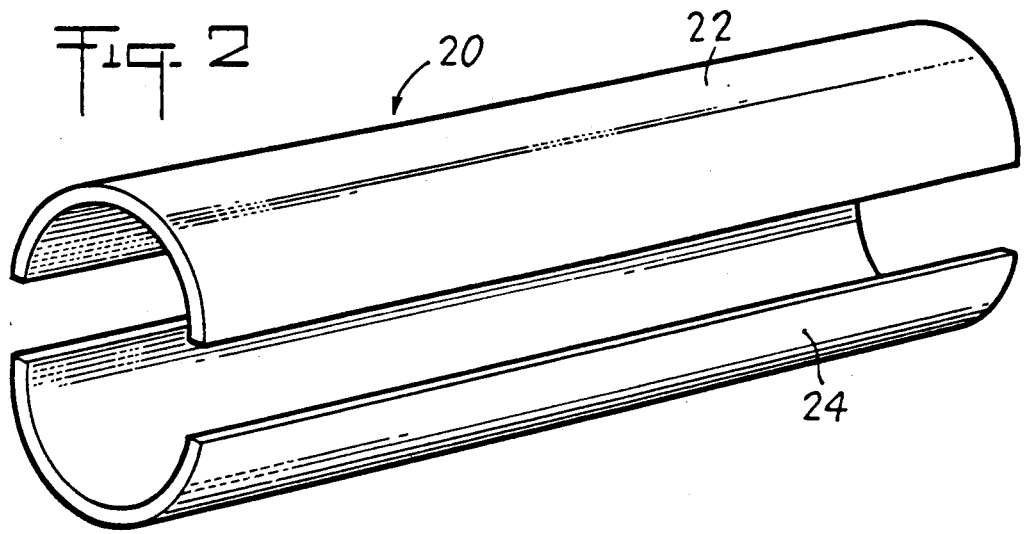
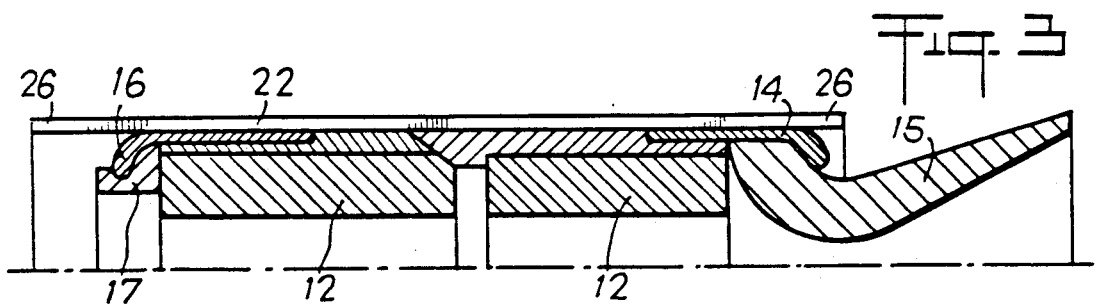
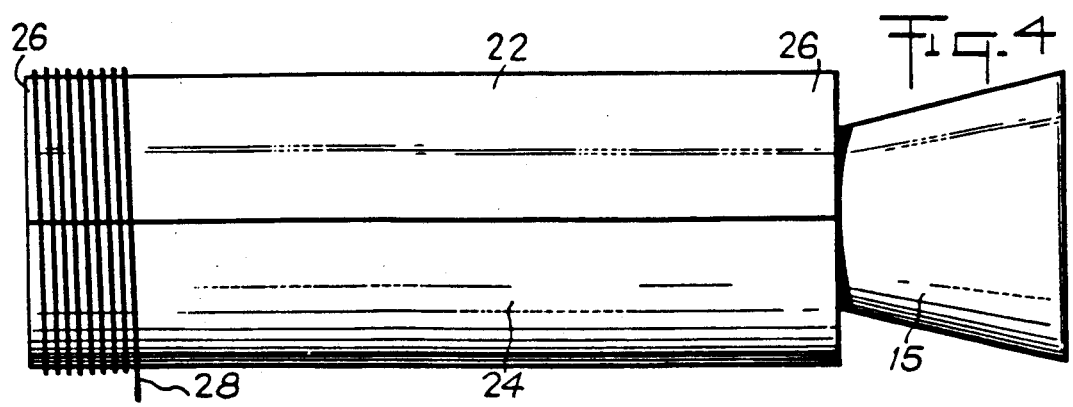

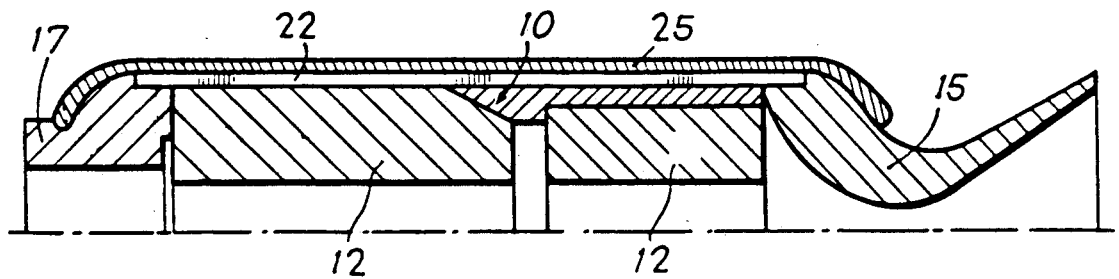
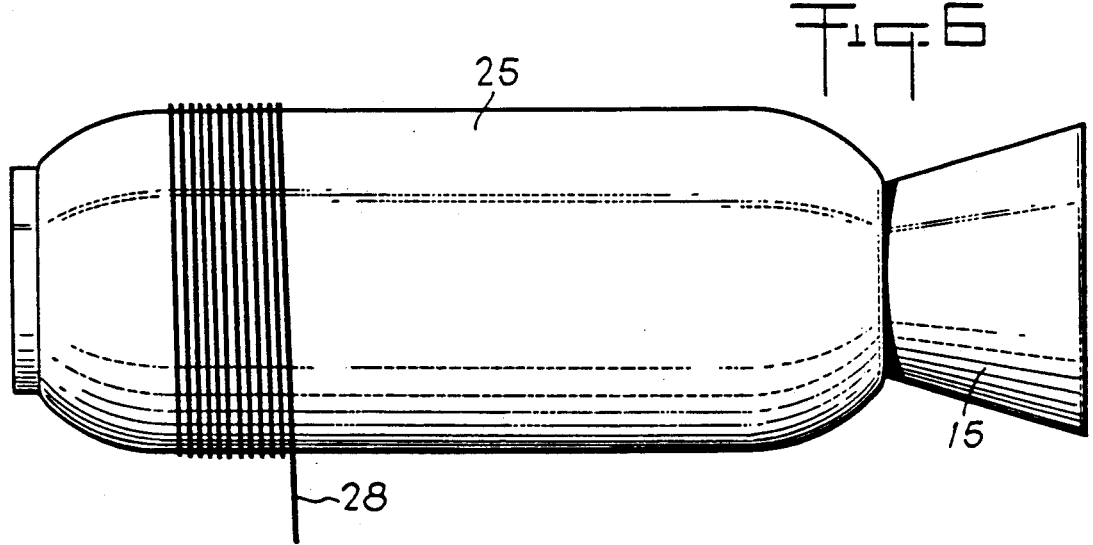
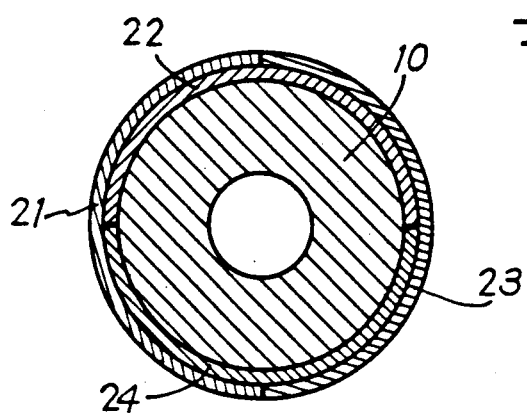

5,032,201

METHOD FOR THE PRODUCTION OF A COMBUSTION CHAMBER FOR SOLID PROPELLANT ROCKET MOTOR

This application is a continuation of application Ser. No. 07/115,753, filed Nov. 2, 1987, now abandoned.

FIELD OF THE INVENTION

The present invention relates to a method for the production of a combustion chamber for solid propellant rocket motor.

BACKGROUND OF THE INVENTION

A propellant for solid rocket motors normally comprises a propellant grain block housed inside a tubular structure with optional interposition of a heat protection, and front and rear walls connected to the tubular structure. The assembly formed by the tubular structure and the two walls constitutes the combustion chamber.

Various methods are currently used for producing solid propellant rocket motors.

Some of these methods consist first of all in producing the tubular structure of the chamber and then in casting the propellant block therein. This is the case with rocket motors in metal or in composite material. The assembly can be completed with detachable end walls wedged in position as described in French Patent application No. 86 00 877 (Publication No. 2 593 238). The chamber obtained according to this technique is rigid and able to withstand high temperatures due to the fact that its constituting elements are produced separately and that in such a case the requirements for each one can be met.

However, it is very difficult with this particular technique to introduce, in the tubular structure of the combustion chamber, the propellant which is constituted of a block or, in some cases, of an assembly of segments, because this introduction ends up in a groping assembly operation.

French Patent No. 1 386 856 did propose to produce the combustion chamber in modules form, each module comprising a tubular sector forming one part of the tubular structure, and a cylindrical sector forming one part of the propellant block and being fixed on the tubular sector. In the case of rocket motors of large dimensions, the object was to convey the modules separately to the launching site, to be thereafter assembled, which avoided having to transport the fully mounted propelling chamber. Undoubtedly, this method raises problems which are difficult to solve, as regards both the manufacture of the modules and their assembly in order to obtain, by simple joining-up of the modules, a chamber which has a defect-free propellant block as well as a faultless tubular structure.

Another known method, such as that described in French Patent No. 1 356 673 or, more recently, in French Patent No. 83 15 263 (Publication No. 2 552 494), consists in first producing the propellant, and then producing the tubular structure of the combustion chamber in a filamentary composite material, such as of the glass/epoxy resin type or of the carbon/epoxy resin type, by winding the material on the propellant and polymerizing the resin. This technique, however, requires the use of a resin having a relatively low polymerization temperature, i.e. less than about 100° C., because of the presence of the propellant. It becomes then difficult, if not impossible, to obtain a structure which will be perfectly capable of withstanding the heat which the missile containing the rocket motor is subjected to.

SUMMARY OF THE INVENTION

It is therefore the object of the present invention to propose a method for producing combustion chambers of which the mechanical performance is virtually not affected by the high temperatures encountered by such chambers in service, and in which the propellant can be introduced without any particular difficulty, even when said propellant is constituted of assembled segments, said method further permitting a ready assembly of the chamber.

This object is reached with a method which generally comprises the steps of separately producing the propellant and of subsequently forming the tubular structure thereon, method in which, according to the invention, the tubular structure is formed by placing sectors of tube around the propellant, with interposition of an adhesive material, which sectors being juxtaposed edge to edge, constitute a cylindrical tube, and by forming a winding around said tube, at least in circumferential direction.

The sectors of tube can be produced by longitudinal cutting of a prefabricated tube. The circumferential winding ensures the resistance to pressure of the combustion chamber during operation, while the tubular structure formed by the assembled sectors of tube ensures its rigidity.

In addition, and due to the fact that the sectors of tube are produced separately, they can, when being manufactured, be given the required rigidity and temperature resistance. In particular, they can be produced in a composite material in which the matrix is a resin with high thermal resistance, this giving the material greater immunity from the high temperatures encountered while in service. But, as a rule, resins with high thermal resistance have high polymerization temperatures, which makes it impossible for them to be used in the known methods where the tubular structure is constituted by a filamentary composite material wound directly on the propellant.

BRIEF DESCRIPTION OF THE DRAWINGS

The invention will be more readily understood on reading the following description with reference to the accompanying drawings in which:

FIG. 1 is a cross-sectional view showing the propellant assembly constituted of two segments, and front and rear walls;

FIG. 2 is a perspective view of a tube cut longitudinally in sections,

FIG. 3 is a cross-sectional view showing how the sectors constituting the tubular structure of the combustion chamber are mounted on the propellant, FIG. 4 illustrates the circumferential winding on the tube sections, FIGS. 5 and 6 illustrate successive steps in a variant embodiment of the method according to the invention, and FIG. 7 illustrate a variant construction of the tubular structure on the propellant.

Like references have been used to designate identical or similar elements in the different figures.

DETAILED DESCRIPTION OF THE PREFERRED EMBODIMENTS

Referring first to FIG. 1, this shows a propellant 10 made up of two assembled segments 12 which can be equipped on their periphery with a heat-protecting layer 11 for protecting the structure of the combustion chamber during operation. The propellant 10 is provided with prefabricated rear 14 and front 16 walls, each wall having a cylindrical outer surface. The front wall comprises a seating 17 and the rear wall carries a tuyere 15.

The tubular structure of the combustion chamber can be produced from a prefabricated tube cut longitudinally into sectors, throughout its length, as illustrated in FIG. 2. In this particular example, the tube 20 is divided into two equal sectors 22,24.

The tube sectors can be in metal or in a fiber-reinforced composite material. In this latter case, the fibers reinforcing the composite material are preferably axially or near-axially oriented in order to confer to the tube a good rigidity. By way of indication, the composite material constituting the tube is of the carbon/epoxy resin type.

The sectors 22 and 24 are fixed around the propellant 10 by means of an adhesive. Understandably, the diameter of the tube 20 is so selected as to be adaptable to that of the propellant block 10 in order to reconstitute perfectly the tubular structure by an edge-to-edge assembly of the sectors.

In the described example, and as illustrated in FIGS. 3 and 4, sectors 22 and 24 are placed over the propellant (FIG. 3); then a winding is formed on the resulting tubular structure (FIG. 4). The winding is formed essentially circumferentially or near-circumferentially. In practice, the circumferential winding 28 can consist in a very small-pitched helical winding produced with a resin-impregnated rove of continuous filaments. A plurality of layers are generally superposed in order to reach the required thickness.

By way of indication, the material constituting the circumferential winding is of the aramide/epoxy type, of which the resin has a polymerizing temperature below about 100° C.

The circumferential winding formed in the above manner essentially ensures the resistance to the internal pressure of the combustion chamber, during operation. The rigidity is provided by the tubular structure formed by the sectors assembly. The sectors 22 and 24, being manufactured entirely separately from the propellant, can be produced in such a way as to unrestrictedly bring to the structure all the properties that are required; in the case of a composite material, in particular, the material matrix will advantageously be constituted by a resin having a high thermal resistance so as to protect the tubular structure of the combustion chamber from the high temperatures to which it is subjected while in service.

In the example illustrated in FIGS. 3 and 4, the tubular structure constituted by sectors 22, 24 extends beyond the front and rear walls of the combustion chamber, thereby forming skir 26 permitting the connection with other elements. In order to absorb the twisting forces exerted on the structure while the missile carrying the rocket motor is used, said structure can be provided with a preliminary helical winding, for example at 45 degrees or a draping, this being followed by a circumferential winding as indicated hereinabove over the whole tubular structure.

It will be noted that, in the case of FIGS. 3 and 4, the rear 14 and front 16 walls are adhesively bonded to the tubular structure when the latter is assembled.

As a variant, and as illustrated in FIGS. 5 and 6, the seating 17 and the tuyere 15 are directly assembled on the ends of the propellant 10.

The two sectors 22, 24 are placed over the propellant with interposition of an adhesive and over the parts of the seating 17 and of the tuyere 15 which are adjacent the propellant (FIG. 5). The resulting tube ceases to act as a skirt. Connection between the seating 17 and the tuyere 15 with the tubular structure around the propellant is achieved by a helical winding 25 formed simultaneously on the seating and the tuyere and on the reconstituted tube (FIG. 5). The construction of the combustion chamber is thereafter completed by a circumferential winding 28 formed on the tubular structure, over the helical winding 25, as explained hereinabove (FIG. 6).

Another obvious possibility of the invention is to adopt, for the front of the combustion chamber, the configuration of FIGS. 3 and 4 and for the rear, the configuration of FIGS. 5 and 6.

The reverse is also possible, i.e. to adopt for the front of the combustion chamber the configuration of FIGS. 5 and 6, and for the rear, the configuration of FIGS. 3 and 4.

The case illustrated in the foregoing is that of a tubular structure produced from a tube divided into two equal sectors. It is however understood that the number of sectors can be higher, each sector extending preferably in an arc of circle not exceeding 180 degrees.

The production of such sectors is not restricted to any one method; indeed, these sectors can be obtained indifferently by producing a cylindrical tube provided with flat areas for longitudinal cutting into sectors, or else by molding or forming of the sectors.

The tubular structure can also be constituted by varying the position of the sectors; it can for example be formed by a plurality of layers of sectors assembled edge-to-edge. FIG. 7 shows such an arrangement of four sectors assembled in pairs; sectors 22 and 24 are assembled on the propellant, then, concentrically and angularly off-set, sectors 21 and 23, in order to avoid superposition of the joining lines.

The case of a segmented propellant is also considered in FIGS. 1, 3 and 5; the technique described for constructing the combustion chamber on the segments is evidently also applicable to a propellant constituted by a single block.

What is claimed is:

1. A method for manufacturing a combustion chamber for a solid propellant rocket motor having front and rear walls, said method comprising the steps of:
   separately providing the propellant in the form of at least one cylindrical block,
   assembling the front and rear walls to the propellant at end portions thereof,
   forming a rigid tubular structure by adhesively fixing around and to the propellant and front and rear walls, separately provided rigid cylindrical sectors of tube having longitudinally extending edge faces, the edge faces of adjacent sectors being juxtaposed longitudinally in face-to-face abutting relationship to constitute a cylindrical tube, said cylindrical sectors being produced in composite material having a matrix showing a high thermal resistance, and forming at least a substantially circumferential winding around said tubular structure.

2. The method of claim 1, wherein the tubular structure constituted by the tube sectors form a skirt at one end at least of the combustion chamber, and a preliminary helical winding is formed throughout the length of the tubular structure before the forming of the circumferential winding, in order to improve the resistance to twisting forces.

3. The method of claim 1, wherein before the forming of the circumferential winding, an helical winding is formed on the tubular structure and on at least one closure in order to complete the connection therebetween.

4. The method of claim 1, wherein the propellant is formed by assembling a plurality of segments.

5. The method of claim 1, wherein the tubular structure is formed of a plurality of layers of longitudinal cylindrical sectors assembled edge-to-edge.

* * * * *